(No Model.) 2 Sheets—Sheet 1.

G. DE LAVAL.
VALVE FOR PUMPS.

No. 542,083. Patented July 2, 1895.

Witnesses:
J. Staib
Chas. H. Smith

Inventor:
Geo. de Laval
per
Lemuel W. Serrell
Atty (No Model.) 2 Sheets—Sheet 2.

G. DE LAVAL.
VALVE FOR PUMPS.

No. 542,083. Patented July 2, 1895.

Witnesses:
J. Staib
Chas. H. Smith

Inventor
Geo. de Laval
per
Lemuel W. Serrell
Att.

UNITED STATES PATENT OFFICE.

GEORGE DE LAVAL, OF WARREN, MASSACHUSETTS, ASSIGNOR TO THE GEO. F. BLAKE MANUFACTURING COMPANY, OF NEW YORK, N. Y.

VALVE FOR PUMPS.

SPECIFICATION forming part of Letters Patent No. 542,083, dated July 2, 1895.

Application filed December 26, 1894. Serial No. 532,951. (No model.)

*To all whom it may concern:*

Be it known that I, GEORGE DE LAVAL, a citizen of the United States, residing at Warren, in the county of Worcester and State of Massachusetts, have invented an Improvement in Valves for Pumps, of which the following is a specification.

This improvement is especially intended for pumps in which there is a heavy pressure upon the valves, and in which automatic mechanism is employed for giving motion to the valve in opening and closing the same.

In Letters Patent No. 49,858, granted September 12, 1865, to T. Clark there is a spring within a case, and the case is moved in one direction to increase the pressure of the spring to hold the valve upon its seat, or in the other direction to lessen the pressure of the spring and allow the valve to rise. My present invention applies to the same class of devices in which the spring-pressure is varied for regulating the action of the valve.

Figure 1:
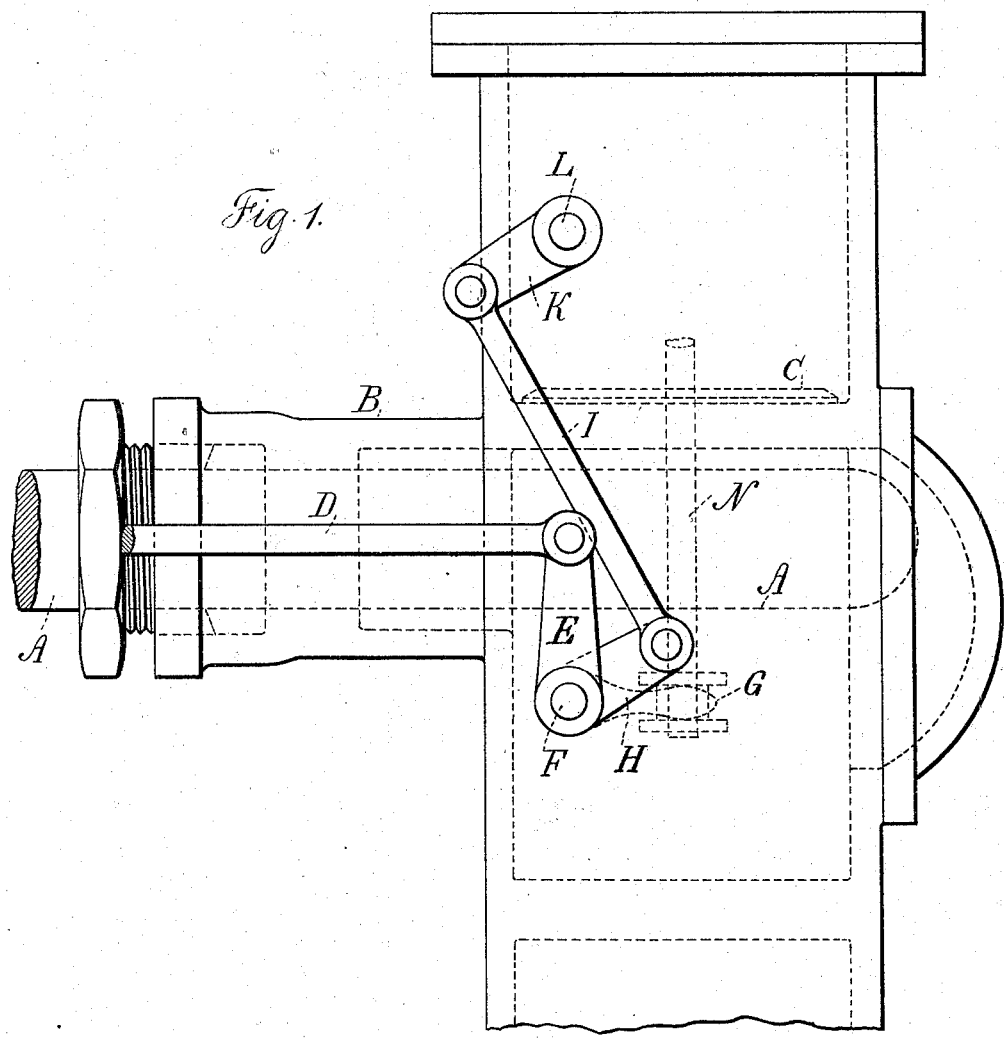
Figure 2:
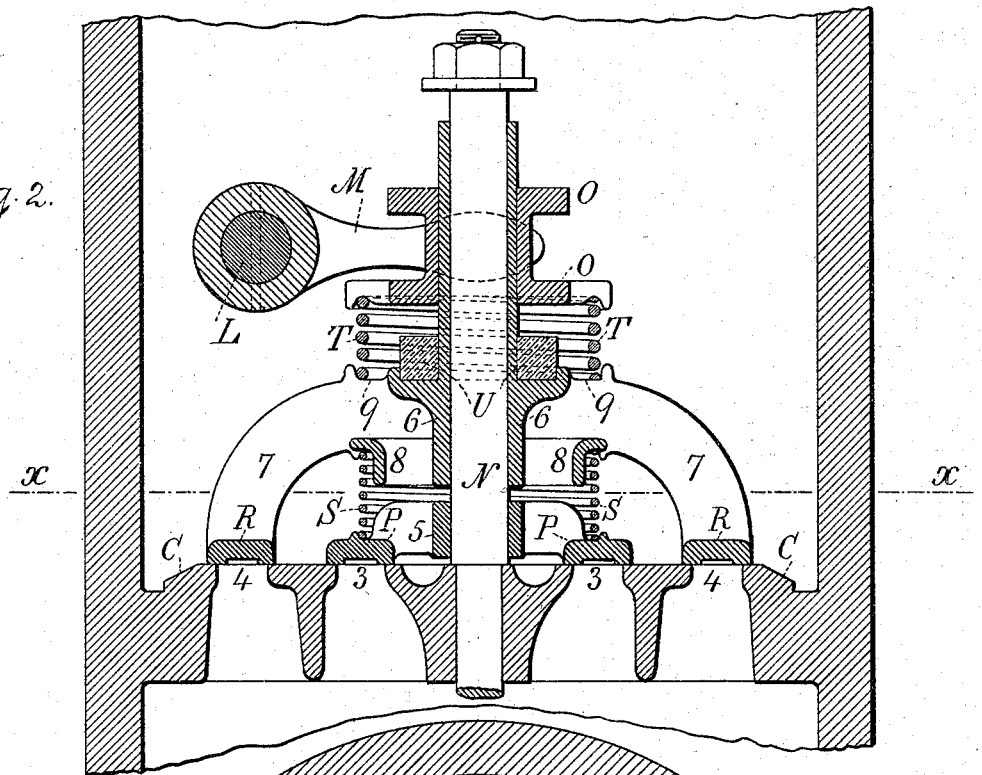
Figure 3:
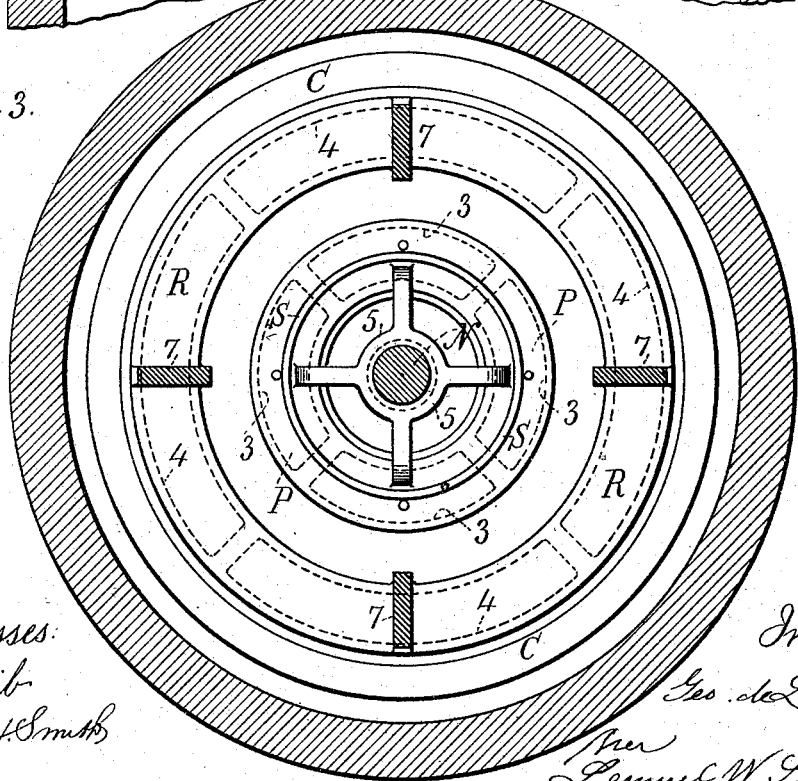

In the drawings, Figure 1 is an external elevation illustrating the manner in which the mechanism can be arranged for controlling the action of the springs. Fig. 2 is a section of the valve, and Fig. 3 a plan view at the line $x$ $x$.

The plunger A is represented as reciprocating in a cylinder B, at one side of which is a valve-seat C; but it is to be understood that this improved valve may be applied to any desired character of pump or engine. The rod D extends to the cross-head or other moving part of the pump, and said rod D is represented as connected to a lever-arm E upon a rock-shaft F, which rock-shaft is either provided with a toe G to act upon the valve-stem or with an arm H, a link I to the lever K, rock-shaft L and toe M to act upon the valve-rod.

In Fig. 2 I have represented the valve-rod N as stationary and the collar O as sliding upon the tubular hub of the valve, but in cases where the valve-stem receives a motion direct the collar O will be fastened to the same.

The valve itself is composed of two parts, the smaller annular valve P and the larger annular valve R, and in the seat C there are two ranges of annular openings, the smaller range of annular openings 3 being adapted to the valve P and the larger range of annular openings being adapted to the valve R.

The valve P is made with a hub 5 that slides upon the valve-stem N, and there are arms extending between the hub and the valve itself, and the valve R is made with a tubular hub 6, sliding upon the stem N, and having curved arms 7 that extend from the same to the annular valve R, and upon the under sides of the arms 7 there is a ring 8, forming an upper bearing for the helical spring S that intervenes between the valve P and such ring 8, and there is a helical spring T intervening between the bearing 9 upon the upper part of the arms 7 and the collar O, and also a rubber block U is advantageously employed upon the top surface of the hub 6, which will come into contact with the under side of the collar O when the spring T is compressed.

The operation of this valve is as follows: The strength of the springs S and T is advantageously proportioned in such a manner that the smaller valve P opens by the pressure beneath the same, and then the collar O is moved to lessen the pressure of the spring T and allow the valve R to open, and the fluid has a free passage at each side of the annular valves P and R, and when the valves are being closed the movement of the collar O increases the strength of the spring T and brings the valve R down upon its seat with rapidity and reliability, so as to prevent any vibration of the valve, and at the same time the movement of the valve R and its collar S compresses the spring S, causing the valve P also to close in a reliable manner and usually immediately after the closing of the valve R. Thus both valves receive a positive movement by the mechanism, and they have a double beat, the valve P closing the moment the piston or plunger reaches its extreme movement; and it is to be understood that the mechanical movement given to the collar O is to be so timed as to allow the valves to open and give a free discharge for the fluid without back-pressure resulting from the valve becoming a resistance to the passage of the water through the seat.

I do not claim a spring for pressing the valve to its seat; neither do I claim a mechanism for lessening or increasing the pressure of the spring against the valve.

In my improvement the valves being annular allow the liquid to pass out at both sides of each valve, and hence the valves do not require to be raised as high as heretofore usual to give a free discharge.

I claim as my invention—

1. The combination with the valve seat having annular water ways, of two annular valves, hubs and arms for the same and a valve rod, and a spring intervening between the two annular valves, substantially as set forth.

2. The combination with a valve seat having two annular water ways through the same, of a main annular valve and its hub, a smaller valve and its hub, a rod upon which the hub of the smaller valve can slide, a spring intervening between the smaller and larger valves, a collar and a spring between the same and the larger valve and means for moving the collar and varying the pressure of the spring, substantially as set forth.

3. The combination with a valve seat having two annular water ways through the same, of a main annular valve and its hub, a smaller valve and its hub, a rod upon which the hub of the smaller valve can slide, a spring intervening between the smaller and larger valves, a collar and a spring between the same and the larger valve and means for moving the collar and varying the pressure of the spring, and a rubber block between the hub of the main valve and the collar, substantially as set forth.

4. The combination with the valve seat having annular passages, of a central rod, a smaller valve and its hub sliding upon the rod, a larger annular valve and its hub sliding upon the rod, a helical spring intervening between the two valves, a collar, and a spring intervening between the collar and the larger annular valve, and means for moving the collar endwise and varying the action of the spring upon the valve, substantially as set forth.

Signed by me this 13th day of December, 1894.

GEORGE DE LAVAL.

Witnesses:
FRED E. COOK,
GEORGE P. ABORN.